(12) United States Patent
Lung

(10) Patent No.: US 7,151,639 B2
(45) Date of Patent: Dec. 19, 2006

(54) THIN-TYPE SPHERICAL LENS

(75) Inventor: Ting-Hua Lung, Taoyuan County (TW)

(73) Assignee: Everspring Industry, Co., Ltd., Taoyuan County (TW)

( * ) Notice: Subject to any disclaimer, the term of this patent is extended or adjusted under 35 U.S.C. 154(b) by 0 days.

(21) Appl. No.: 11/126,256

(22) Filed: May 11, 2005

(65) Prior Publication Data

US 2006/0256452 A1 Nov. 16, 2006

(51) Int. Cl.
*B02B 3/08* (2006.01)

(52) U.S. Cl. .................. 359/742; 359/741; 359/546

(58) Field of Classification Search ............... 359/742, 359/741, 546, 796, 797
See application file for complete search history.

(56) References Cited

U.S. PATENT DOCUMENTS 4,787,772 A  11/1988  Wagner
2004/0141241 A1*  7/2004  Claytor ................ 359/742

OTHER PUBLICATIONS

Fernando Erismann, Design of a plastic aspheric Fresnel lens with a spherical shape (Apr. 1997), Opt. Eng. 36(4) 988-991.*

* cited by examiner

*Primary Examiner*—Timothy Thompson
(74) *Attorney, Agent, or Firm*—Birch, Stewart, Kolasch & Birch, LLP

(57) ABSTRACT

A thin-type spherical lens, fabricated according to the result of the virtual procedures of removing the portion of each of a plurality of lens bodies with different radii of curvature of light-exiting faces, which corresponds to a spherical surface with the optical axis of the thin-type spherical lens as its central axis, and assembling the preserved portions thereof to form a plurality of grooves as the light-exiting faces, which are equivalent to the grooves of the conventional Fresnel lens, wherein the depths or the widths of the plurality of grooves are different, and the curvature radii of the plurality of light-exiting faces are also designed to be different so that the lights emerging from the plurality of light-exiting faces are all focused on an identical point. The present invention can, as compare to the conventional approach, reduce the lens thickness when the radius of the apertures on the lens increased.

5 Claims, 6 Drawing Sheets

THIN-TYPE SPHERICAL LENS

FIELD OF THE INVENTION

The present invention relates to a spherical lens, particularly to a thin-type spherical lens.

BACKGROUND OF THE INVENTION

At present, the passive infrared sensor (PIR), which is used to detect the human being, adopts the lens array made of high-density polyethylene (HDPE) to focus the infrared ray emitted by the human being. In general, a lens can be categorized into a traditional Fresnel one or a general spherical one. The configuration of the array depends on the type of the lens mentioned above. The array adopting the Fresnel lenses is usually a flat and rectangular sheet body 10, as shown in FIG. 1 and FIG. 2, and one smooth face thereof is used as the light-exiting face 12, and the other face has many carved concentric circles 14 and functions as the light-entering face 16. Each of the carved concentric circles 14 can be regarded as a mini prism, and after being refracted by the mini prism, light is deflected to the focus, and thereby, lights are concentrated. The other type of lens array 20, as shown in FIG. 3, is composed of general spherical lenses 22.

However, there are some problems existing in the practical application of the abovementioned lenses:

1. The traditional Fresnel lens utilizes the principle of prism to focus light, and whether lights can be concentrated on one point depends on the density of the carved concentric circles; if the density too low, the focusing will lack sufficient accuracy; if the density too high, the incident light will not be focused but be diffracted. U.S. Pat. No. 4,787,722 discloses a Fresnel lens, wherein the light-entering face has multiple carved grooves, and the widths of the carved grooves gradually shrinks from the center to the edge to enable the depths of the carved grooves to be uniform, which can overcome the problem resulting from the past design that the grooves of the Fresnel lens have identical widths nevertheless without identical depths, which results in that the Fresnel lens is unable to be thinned, owing to that the thickness thereof is limited by the depths of the carved grooves. However, the Fresnel lens with array of the abovementioned grooves is to be bent into a columnar shape, which results in that the primary optical axis won't be perpendicular to the lens, which further induces comatic aberration and energy loss.

2. In contrast to flatness, thinness and lightness of the Fresnel lens, the spherical lens has two spherical surfaces, and the lenses used to detect objects in various directions and at various distances are assembled into a lens array. One surface of the spherical lens can be a spherical surface having a given radius of curvature; thus, the spherical lens has a ball-like appearance, as shown in FIG. 3. Owing to the ball-like appearance, the conventional spherical lens array has the advantage that all the primary optical axes are perpendicular to the lenses when detecting the infrared ray emitted from human body, which results in a superior focusing effect. In contrast to the thinness of the Fresnel lens, when the aperture of the lens of spherical lens array is intended to increase, the thickness of the lens should be increased. However, increasing the thickness of the lens reduces the transmittance of infrared ray. Therefore, the lens aperture of such a kind of spherical lens array has to be maintained within a given range, and when the ambient temperature over 28° C., the detection distance will be reduced.

SUMMARY OF THE INVENTION

The primary objective of the present invention is to provide a thin-type spherical lens, wherein increasing the lens aperture does not need increasing the thickness of the lens and the focusing effect can still be maintained superior.

To achieve the aforementioned objective, the thin-type spherical lens of the present invention comprises a light-entering face and a plurality of light-exiting faces corresponding to the light-entering face, wherein the light-entering face is a spherical surface, and the plurality of light-exiting faces are fabricated according to the result of the virtual procedures of removing the portion of each of a plurality of lens bodies with different radii of curvature of light-exiting faces, which corresponds to a spherical surface with the optical axis of the thin-type spherical lens as its central axis, and assembling the preserved portions thereof to form a plurality of grooves with different widths and depths, which function like the grooves of the conventional Fresnel lens, in order to enable all the light-exiting faces to have an identical focal length.

The technical contents and preferred embodiments of the present invention are to be described below in detail in cooperation with the attached drawings.

DETAILED DESCRIPTION OF THE PREFERRED EMBODIMENTS

Figure 1:
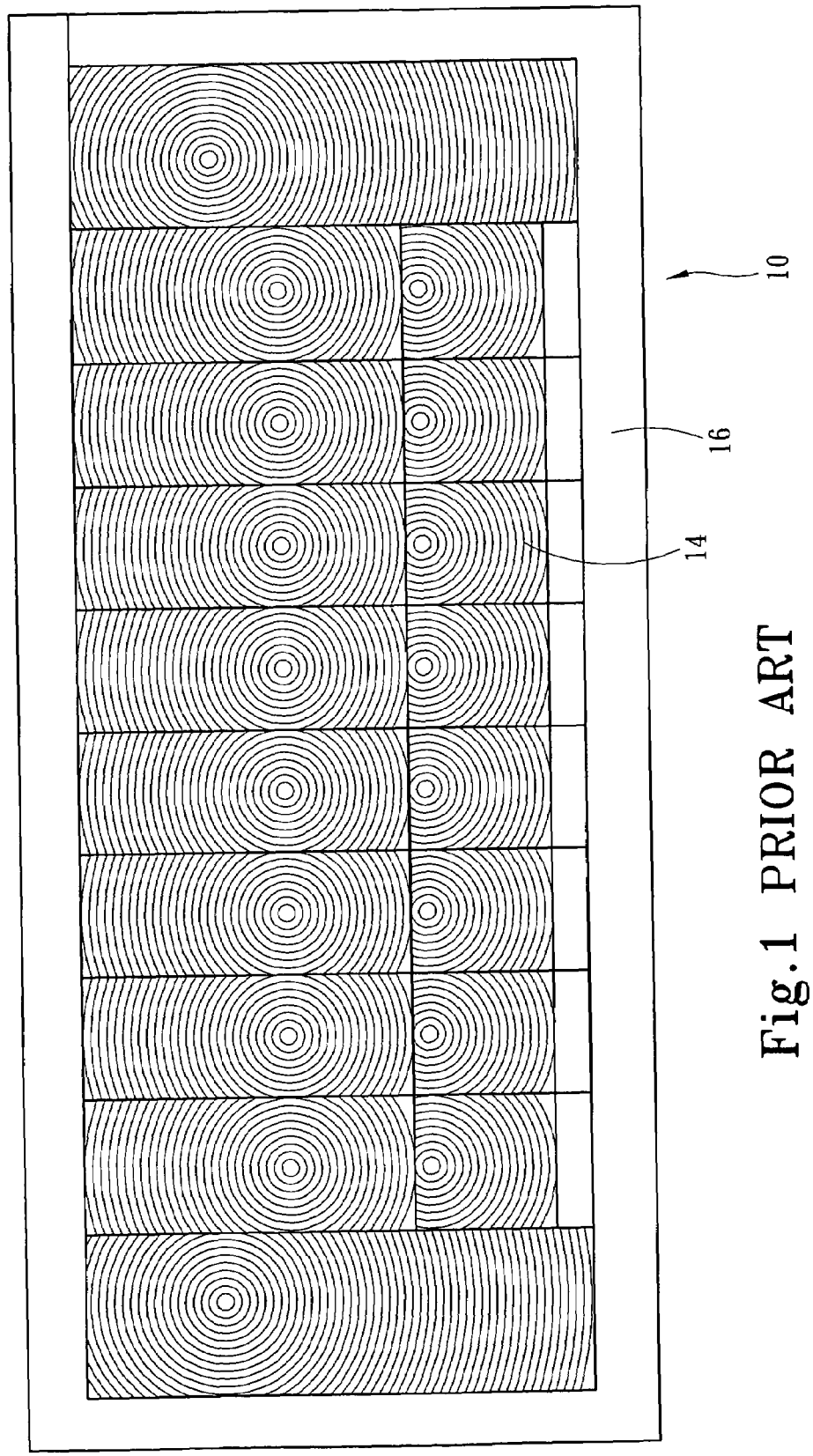
FIG. 1 is a schematic diagram of the lens array formed of the conventional Fresnel lenses.
Figure 2:
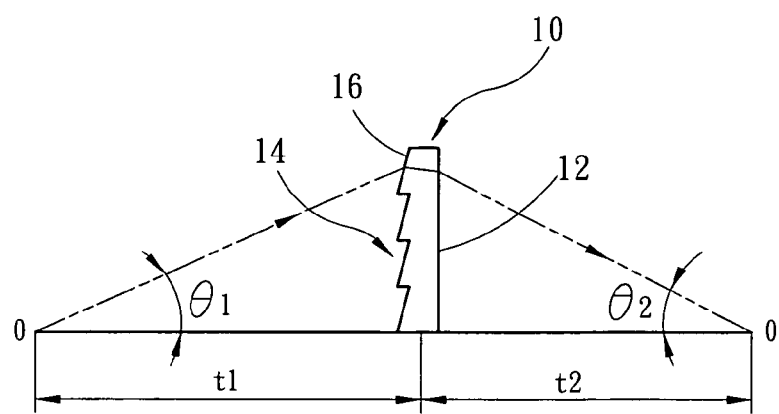
FIG. 2 is a schematic diagram of the optical path of the conventional Fresnel lenses.
Figure 3:
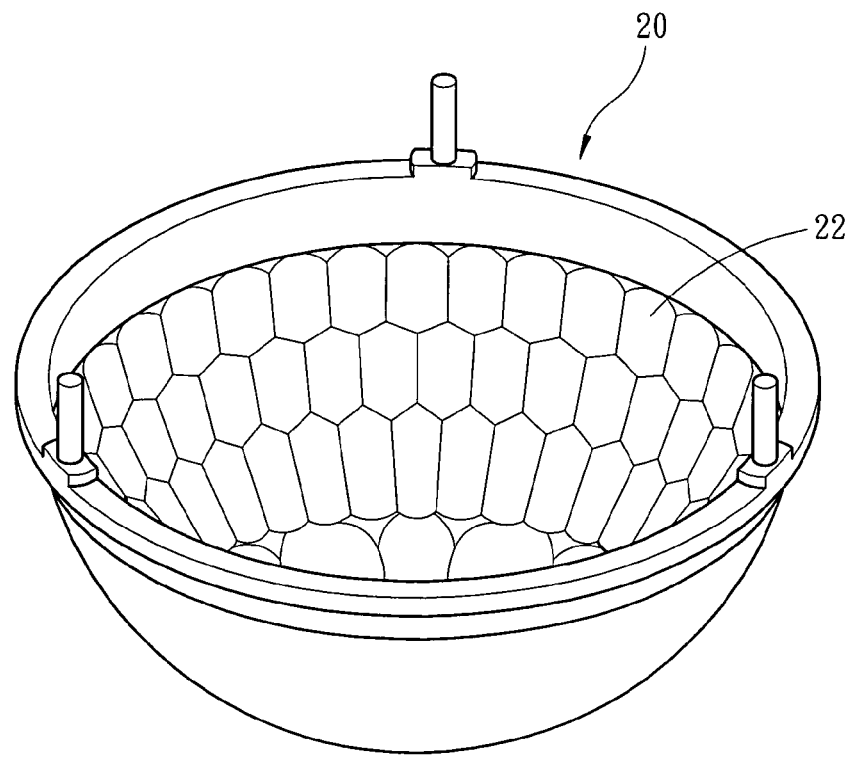
FIG. 3 is a schematic diagram of the lens array formed of the conventional spherical lenses.
Figure 4:
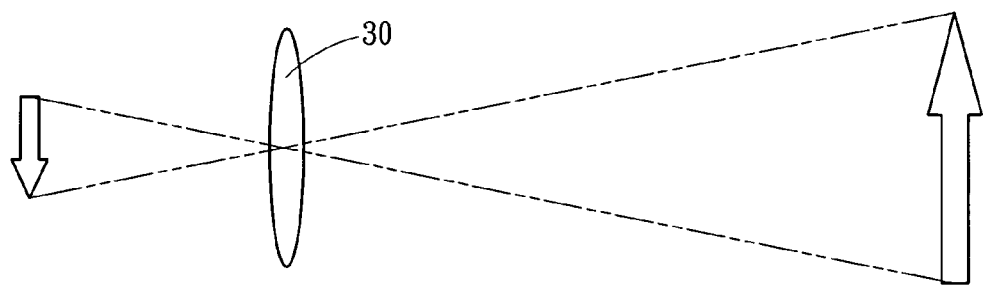
FIG. 4 is a diagram showing the image formed by a general spherical lens.
Figure 5:
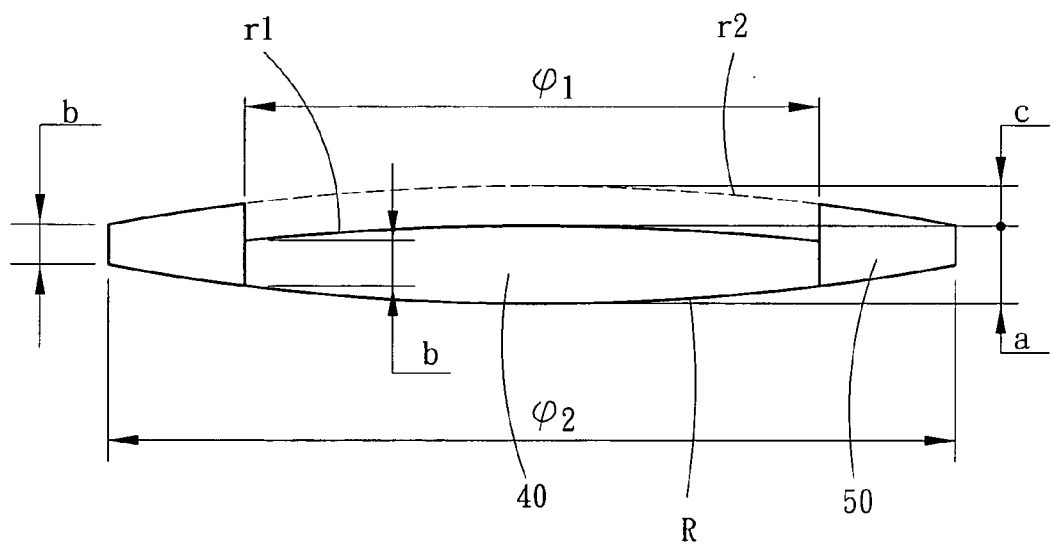
FIG. 5 is a schematic diagram showing a simulated spherical lens with a groove deduced according to the present invention.

Firstly, the process, which deduces the thin-type spherical lens of the present invention from a conventional spherical lens, will be described in detail herein. Refer to FIG. 4 showing a diagram of a general spherical lens 30. To increase the transmittance of light energy, such as infrared ray, increasing the aperture of the lens is an obvious and direct method; however, the thickness of the lens cannot exceed but should be maintained within a given range. As shown in FIG. 5, based on the above principle, a spherical lens 40, which has an aperture of φ1, an external curvature radius of R, an internal curvature radius of r1, a central thickness of a, an edge thickness of b, and a focal length of f (not shown in the drawing), is firstly simulated. A spherical lens 50 with an aperture of φ2 is also simulated, wherein φ2>φ1, and the external curvature radius thereof is maintained R, and the edge thickness thereof is maintained b, and the central thickness is increased to a+c; then, the internal curvature thereof is modified to be r2 to enable the focal length of the spherical lens 50 to be maintained f. Next, a circle, which has a diameter of φ1 and its circle center at the center of the spherical lens 50, is drawn; the portion of lens body of the spherical lens 50 corresponding to the above-mentioned circle is removed from the spherical lens 50, and the portion of lens body of the spherical lens 50 having an internal face area of π cφ2 is preserved, and the preserved portion of the spherical lens 50 is engaged with the spherical lens 40 to form a spherical lens having an external appearance of spherical surface and a grooved surface in the other side, which results in a spherical lens having an aperture equal to that of the spherical lens 50 but having a thickness equal to that of the spherical lens 40 and an identical focal length of f. Such a virtual procedure will be repeated until ten spherical lenses are engaged together.

Figure 6:
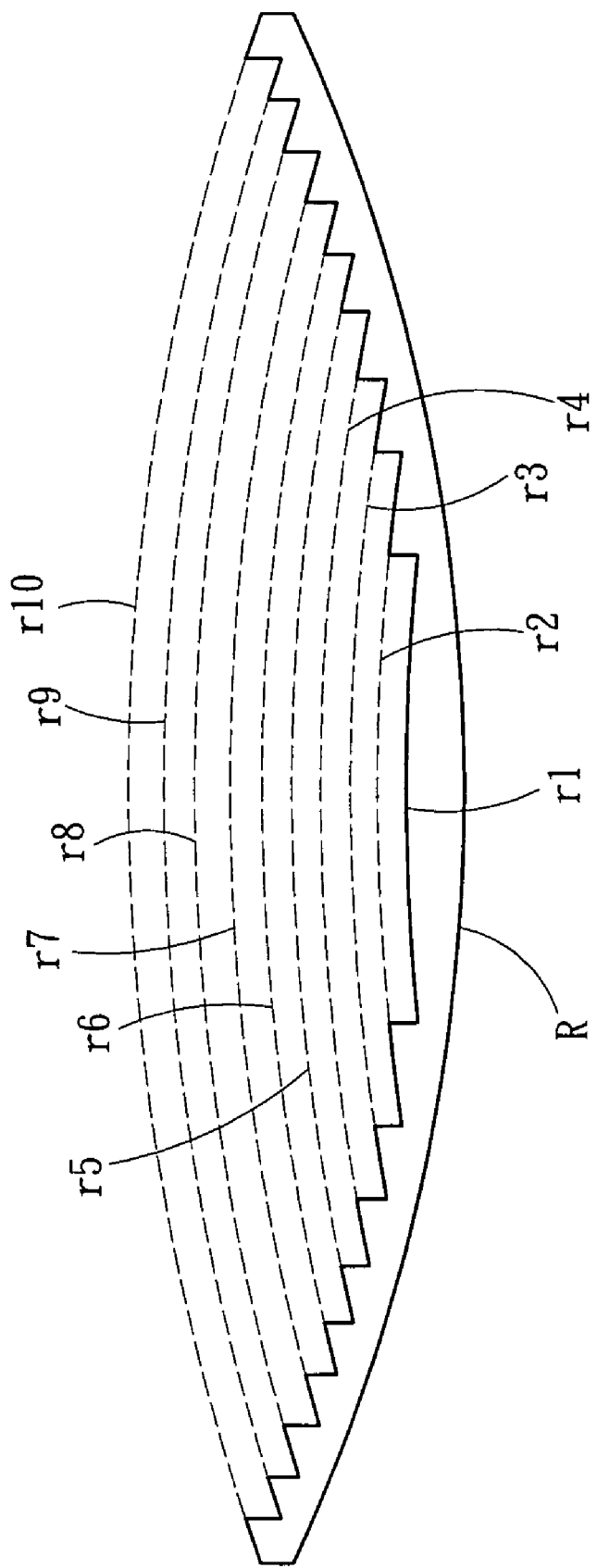
FIG. 6 is a schematic diagram showing another simulated spherical lens with grooves deduced according to the present invention.

Refer to FIG. 6 and the following table.

| lens number | internal curvature radius (mm) | external curvature radius (mm) | aperture (mm) | central thickness (mm) |
|---|---|---|---|---|
| Lens01 | r1 = 30.78 | R = 30 | 3.889725709 | 1.0 |
| Lens02 | r2 = 31.39 | R = 30 | 5.559020800 | 1.5 |
| Lens03 | r3 = 32.18 | R = 30 | 6.776599537 | 2.0 |
| Lens04 | r4 = 33.05 | R = 30 | 7.912425212 | 2.5 |
| Lens05 | r5 = 33.90 | R = 30 | 8.819136757 | 3.0 |
| Lens06 | r6 = 34.80 | R = 30 | 9.731063561 | 3.5 |
| Lens07 | r7 = 35.65 | R = 30 | 10.48948465 | 4.0 |
| Lens08 | r8 = 36.65 | R = 30 | 11.36879943 | 4.5 |
| Lens09 | r9 = 37.90 | R = 30 | 12.12500299 | 5.0 |
| Lens10 | r10 = 38.90 | R = 30 | 12.82884031 | 5.5 |

From the above table and FIG. 6, it can be concluded: for the spherical lens simulated according to the abovementioned deduction, even though the aperture of the spherical lens is increased, the central thickness of the spherical lens can still be controlled within an appropriate range, and the lights emerging from the spherical lens can be focused on an identical point.

Figure 7:
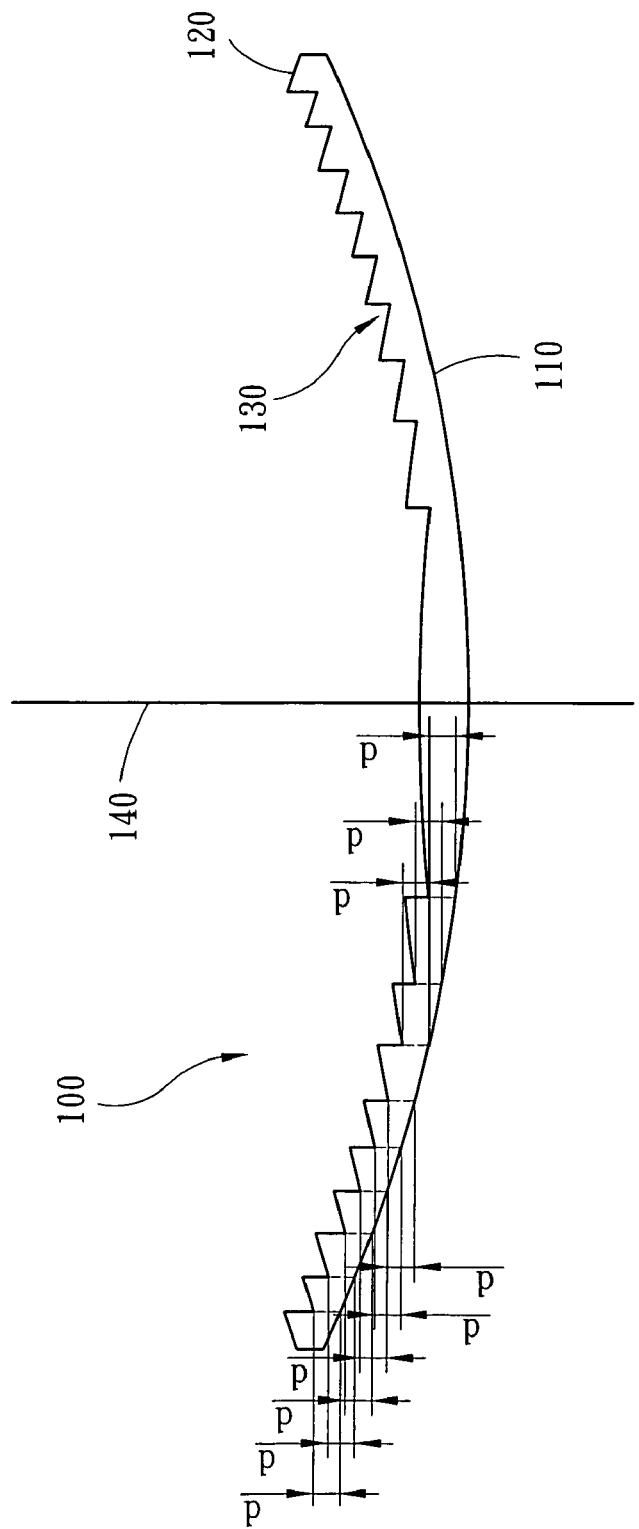
FIG. 7 is a side view of the thin-type spherical lens of the present invention.
Figure 8:
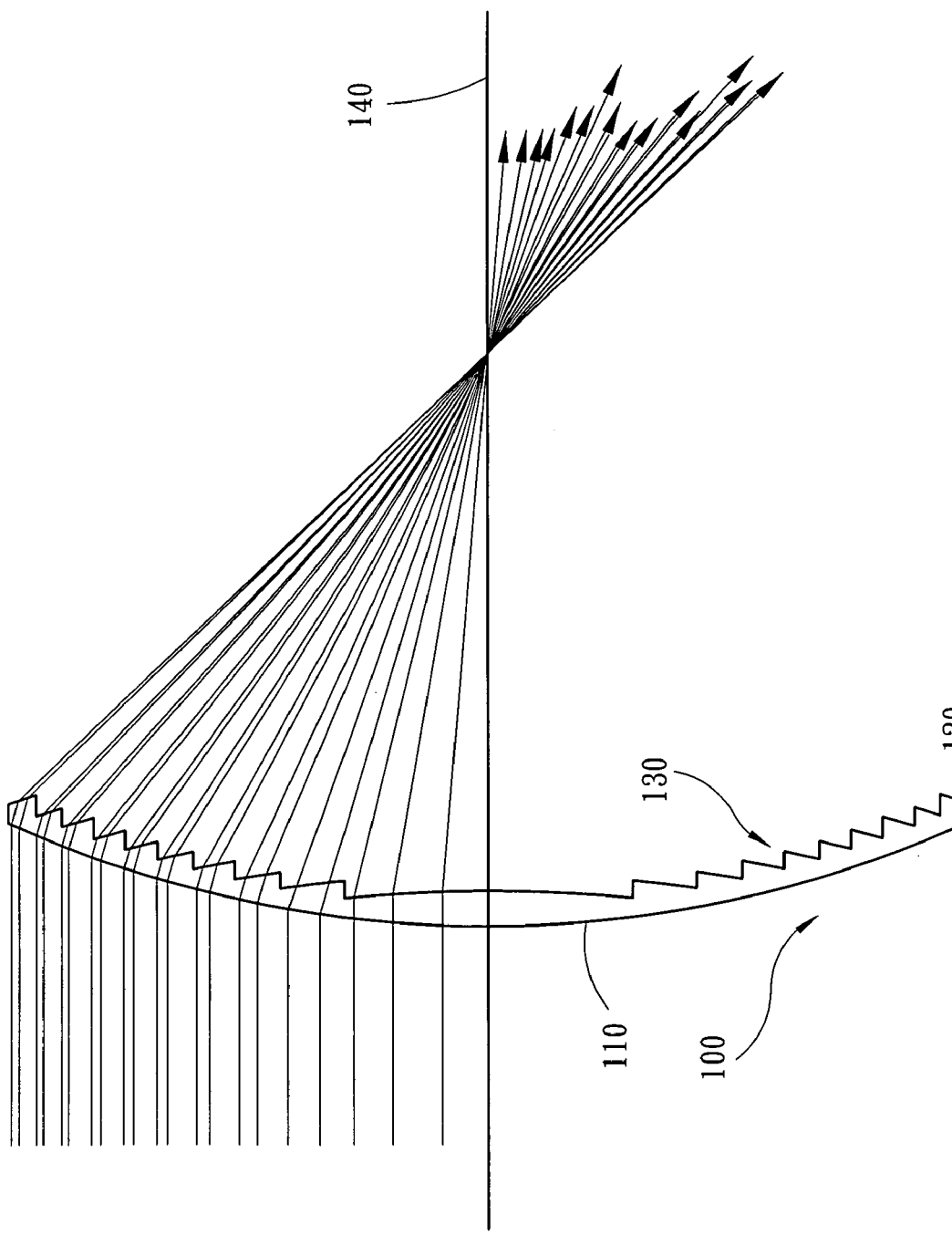
FIG. 8 is a schematic diagram of the optical path of the thin-type spherical lens of the present invention.

According to the above discussion, the thin-type spherical lens of the present invention is to be defined below. Referring to FIG. 7 and FIG. 8, the thin-type spherical lens 100 of the present invention can be made of a transparent, semi-transparent, or opaque material having focusing effect, such as a glass, an acrylic, or a plastic, and the plastic can be High-Density Polyethylene (HDPE), or another material with superior plasticity. The thin-type spherical lens 100 has a light-entering face 110 and a plurality of light-exiting faces 120 corresponding to the light-entering face 110; the light-entering face 110 is the face where the incident light enters; the plurality of light-exiting faces 120 are fabricated according to the result of the virtual procedures of removing the portion of each of a plurality of lens bodies with different radii of curvature of light-exiting faces, which corresponds to a spherical surface with the optical axis 140 of the thin-type spherical lens 100 as its central axis, and assembling the preserved portions thereof to form a plurality of grooves equivalent to the grooves of the conventional Fresnel lens. As shown in the drawings, the depths or the widths of grooves 130 are different, and the curvature radii of the plurality of light-exiting faces are also designed to be different so that the lights emerging from the plurality of light-exiting faces 120 all have an identical focal length. The depth and width of each groove 130 depends on the curvature radius of the corresponding light-exiting face 120. In this embodiment, the grooves 130 with different depths and widths revolve around the optical axis 140 of the thin-type spherical lens 100, and the widths of those grooves 130 are gradually decreased from the optical axis 140 of the thin-type spherical lens 100 to the edge of the thin-type spherical lens 100, and the distances between the light-entering face 110 and the point of each of the plurality of grooves 130, which is most far away from the optical axis 140, are identical to d, and the longitudinal side of each groove 130 is parallel to the optical axis 140. In the thin-type spherical lens 100 of the present invention, the maximum aperture is about twice the focal length thereof.

The present invention improves the conventional spherical lens via the result of the virtual procedures of removing the portion of each of a plurality of lens bodies with different radii of curvature of the light-exiting faces, which corresponds to a circle with its circle center at the center of the lens, and assembling the preserved portions thereof to form a plurality of grooves as the light-exiting faces, which are equivalent to the grooves of the conventional Fresnel lens, wherein the depths or the widths of the plurality of grooves are different, and the curvature radii of the plurality of light-exiting faces are also designed to be different so that the lights emerging from the plurality of light-exiting faces are all focused on an identical point and all the focal lengths of the plurality of light-exiting faces are identical, as shown in FIG. 8. Therefore, the present invention can overcome the problem of thinning the spherical lens in the conventional spherical lens, which results from that increasing the aperture thereof needs increasing the thickness thereof. As both the light-entering face and the light-exiting face of the thin-type spherical lens of the present invention are spherical surfaces, bending the lens into a columnar shape is unnecessary for the present invention, which can thus avoid the problems that the primary optical axis cannot be perpendicular to the lens, and that the focusing effect is inferior, such as those occurring in the conventional Fresnel lens. The thin-type spherical lens of present invention has superior utility and can be applied to the infrared sensor, the piezo-electric-type infrared sensor, and other optical devices needing focusing function.

What is claimed is:

1. A thin-type spherical lens, comprising a light-entering face and a plurality of light-exiting faces corresponding to said light-entering face, wherein said light-entering face is a spherical surface, and said plurality of light-exiting faces are fabricated according to the result of the virtual procedures of removing the portion of each of a plurality of lens bodies with different radii of curvature of light-exiting faces, which corresponds to a spherical surface with the optical axis of said thin-type spherical lens as its central axis, and assembling the preserved portions to form a plurality of grooves as said plurality of light-exiting faces, and wherein the curvature radii of said plurality of light-exiting faces are designed to be different so that all the focal lengths of said plurality of light-exiting faces are identical;

wherein the maximum aperture of said thin-type spherical lens is about twice the focal length thereof.

2. The thin-type spherical lens according to claim 1, wherein said removing portion of each of plurality of lens bodies with different radii of curvature forms plurality of grooves with different depths and widths.

3. The thin-type spherical lens according to claim 2, wherein said plurality of grooves with different depths and widths revolve around said optical axis of the lens.

4. The thin-type spherical lens according to claim 2, wherein the widths of said plurality of grooves are gradually decreased from said optical axis of said thin-type spherical lens to the edge of said thin-type spherical lens.

5. The thin-type spherical lens according to claim 2, wherein the distances between said light-entering face and the point of each of said plurality of grooves, which is most far away from said optical axis, are identical.

* * * * *